United States Patent [19]

Malik et al.

[11] Patent Number: 5,694,310

[45] Date of Patent: Dec. 2, 1997

[54] THREE PHASE INPUT BOOST CONVERTER

[75] Inventors: Randhir Singh Malik, Colchester, Vt.; Ronnie Arno Wunderlich, Endicott, N.Y.

[73] Assignee: International Business Machines Corporation, Armonk, N.Y.

[21] Appl. No.: 515,092

[22] Filed: Aug. 14, 1995

[51] Int. Cl.$^6$ .............................. H02M 5/42; G05F 1/10
[52] U.S. Cl. ............................................ 363/84; 323/222
[58] Field of Search ......................... 363/17, 21, 41, 363/44, 80, 81, 84, 89, 132; 323/222, 282, 283, 287

[56] References Cited

U.S. PATENT DOCUMENTS

| | | | |
|---|---|---|---|
| 3,919,656 | 11/1975 | Sokal et al. | 330/51 |
| 4,195,333 | 3/1980 | Hedel | 363/21 |
| 4,384,321 | 5/1983 | Rippel | 363/124 |
| 4,449,174 | 5/1984 | Ziesse | 363/21 |
| 4,535,399 | 8/1985 | Szepesi | 363/41 |
| 4,677,366 | 6/1987 | Wilkinson et al. | 323/222 |
| 4,700,285 | 10/1987 | Szepesi | 363/97 |
| 4,709,316 | 11/1987 | Ngo et al. | 363/21 |
| 4,712,169 | 12/1987 | Albach | 363/89 |
| 4,717,884 | 1/1988 | Mitzlaff | 330/251 |
| 4,719,552 | 1/1988 | Albach et al. | 363/44 |
| 4,748,397 | 5/1988 | Ogawa et al. | 323/222 |
| 4,774,649 | 9/1988 | Archer | 363/20 |
| 4,800,477 | 1/1989 | Esposito | 363/17 |
| 4,807,106 | 2/1989 | Baker et al. | 363/84 |
| 4,812,959 | 3/1989 | Driscoll et al. | 363/20 |
| 4,855,888 | 8/1989 | Henze et al. | 363/17 |
| 4,891,746 | 1/1990 | Bowman et al. | 363/131 |
| 4,901,214 | 2/1990 | Hiramatsu et al. | 363/19 |
| 4,924,371 | 5/1990 | Peterson | 363/89 |
| 4,937,728 | 6/1990 | Leonardi | 363/97 |
| 4,940,929 | 7/1990 | Williams | 323/222 |
| 4,942,509 | 7/1990 | Shires et al. | 363/89 |
| 4,974,141 | 11/1990 | Severinsky et al. | 363/81 |
| 4,992,723 | 2/1991 | Zylstra et al. | 323/284 |
| 5,001,620 | 3/1991 | Smith | 363/89 |
| 5,034,874 | 7/1991 | Araki | 363/41 |
| 5,045,989 | 9/1991 | Higaki et al. | 363/37 |
| 5,179,511 | 1/1993 | Troyk et al. | 363/97 |
| 5,180,964 | 1/1993 | Ewing | 323/222 |
| 5,367,247 | 11/1994 | Blocher et al. | 323/222 |
| 5,414,613 | 5/1995 | Chen | 363/52 |
| 5,508,602 | 4/1996 | Borgato et al. | 323/222 |

*Primary Examiner*—Peter S. Wong
*Assistant Examiner*—Bao Q. Vu
*Attorney, Agent, or Firm*—Arthur J. Samodovitz

[57] ABSTRACT

A three phase input, boost power supply comprises first, second and third rectifiers for respective phases of the three phase input. First, second and third boost inductors are interposed between the first, second and third rectifiers, respectively and respective phases of said three phase input. A low pass filter is interposed between the boost inductors and the three phase input. A chopping switch is connected to an output of at least one of the rectifiers in parallel with a load to boost a voltage of the load. A current sensor is connected between the rectifier output and the load. The switch is activated in response to the current sensor sensing approximately zero current flow. The subsequent rate of current rise is proportional to the magnitude of the input voltage. The switch is deactivated based in part on a comparison of the load voltage to a reference voltage. Thus, the input current for each phase has nearly unity power factor, even when one phase drops out.

13 Claims, 5 Drawing Sheets

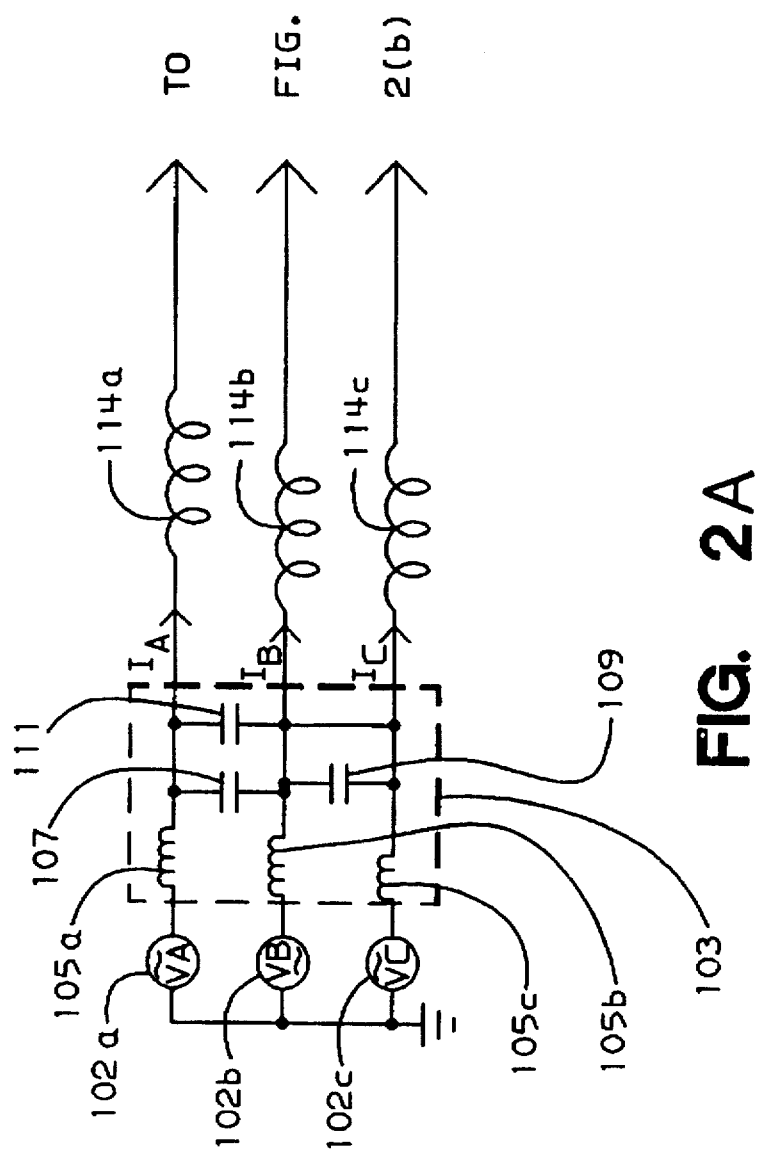

THREE PHASE INPUT BOOST CONVERTER

BACKGROUND OF THE INVENTION

The present invention relates generally to power supplies, and deals more particularly with a three phase input "boost" power supply.

A boost power supply is well known in the industry to convert a rectified input voltage having a DC component to a DC output voltage greater than the input voltage. FIG. 1 illustrates the basic prior art configuration of a boost power supply 40 that operates from a single phase input. Boost power supply 40 comprises a series inductor 42, a series diode 44, a parallel FET switch 46 and a parallel output capacitor 50. When switch 46 is closed, a current flows through inductor 42 and switch 46 to ground. Under these conditions, the full input voltage is applied across inductor 42 with the input end of the inductor exhibiting a higher voltage than the other end. Diode 44 is reversed biased at this time to prevent discharge of capacitor 50, and capacitor 50 supplies a load 52. Subsequently switch 46 is opened, and inductor 42 attempts to maintain the same level and direction of current flow as existed immediately before the switch was opened. However, at this time the current path includes capacitor 50 and load 52. Thus, the inductor voltage switches polarity and a voltage greater than the input voltage is developed at this other end and applied to the load 52 and capacitor 50. This maintains the current flow through inductor 42 that existed immediately before the switch was opened. This current flows through inductor 42, through diode 44, to the load 52 and to capacitor 50, charging capacitor 50. Control 58 times the closing and opening of switch 46, based on a comparison 60 of a ramp voltage to a reference or "error" voltage to maintain the output voltage within a specified range. The error voltage itself is based on a comparison 61 of the load voltage to a reference voltage. Control 58 also ensures that each closure of switch 46 occurs when there is approximately zero volts across switch 46 to minimize ripple currents.

A "power factor" is the phase relationship between the input current and the input voltage. A unity power factor is ideal for most power supplies, and typically, a power company specifies a minimum power factor for equipment. The foregoing single phase power supply has a good power factor, for example, 0.95 or greater.

U.S. Pat. No. 4,384,321 illustrates a three phase input boost power supply having multiple boost inductors and rectifiers interposed between the boost inductors and the three phase input. This circuit provides the boost function and has a high power factor.

A general object of the present invention is to provide a three phase input boost power supply with a higher power factor than the prior art.

Another general object of the present invention is to provide a three phase input boost power supply with a very high power factor even when one of the phases drops out.

SUMMARY OF THE INVENTION

The invention resides in a three phase input, boost power supply comprising first, second and third rectifiers for respective phases of the three phase input. First, second and third boost inductors are interposed between the first, second and third rectifiers, respectively and respective phases of said three phase input. A chopping switch is connected to an output of at least one of the rectifiers in parallel with a load to boost a voltage of the load. A current sensor is connected between the rectifier output and the load. The switch is activated in response to the current sensor sensing approximately zero current flow. The subsequent rate of current rise is proportional to the magnitude of the input voltage. The switch is deactivated based in part on a comparison of the load voltage to a reference voltage.

According to one feature of the present invention, a low pass filter is interposed between the three phase input and the first, second and third boost inductors. Thus, the input current for each phase has nearly unity power factor, even when one phase drops out.

DETAILED DESCRIPTION OF THE PREFERRED EMBODIMENTS

Figure 1:
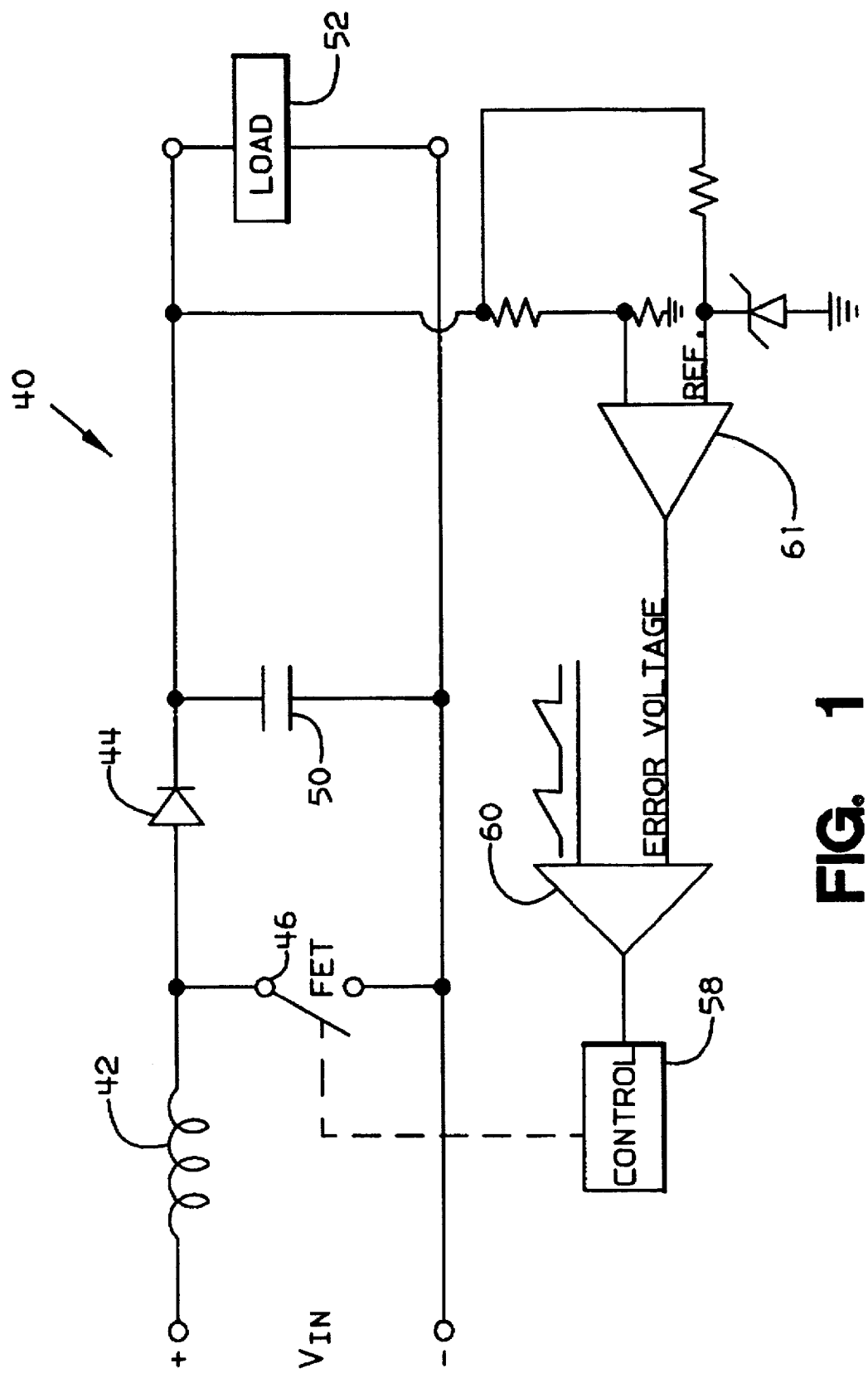
FIG. 1 illustrates a single phase input, boost power supply according to the prior art.
Figure 2B:
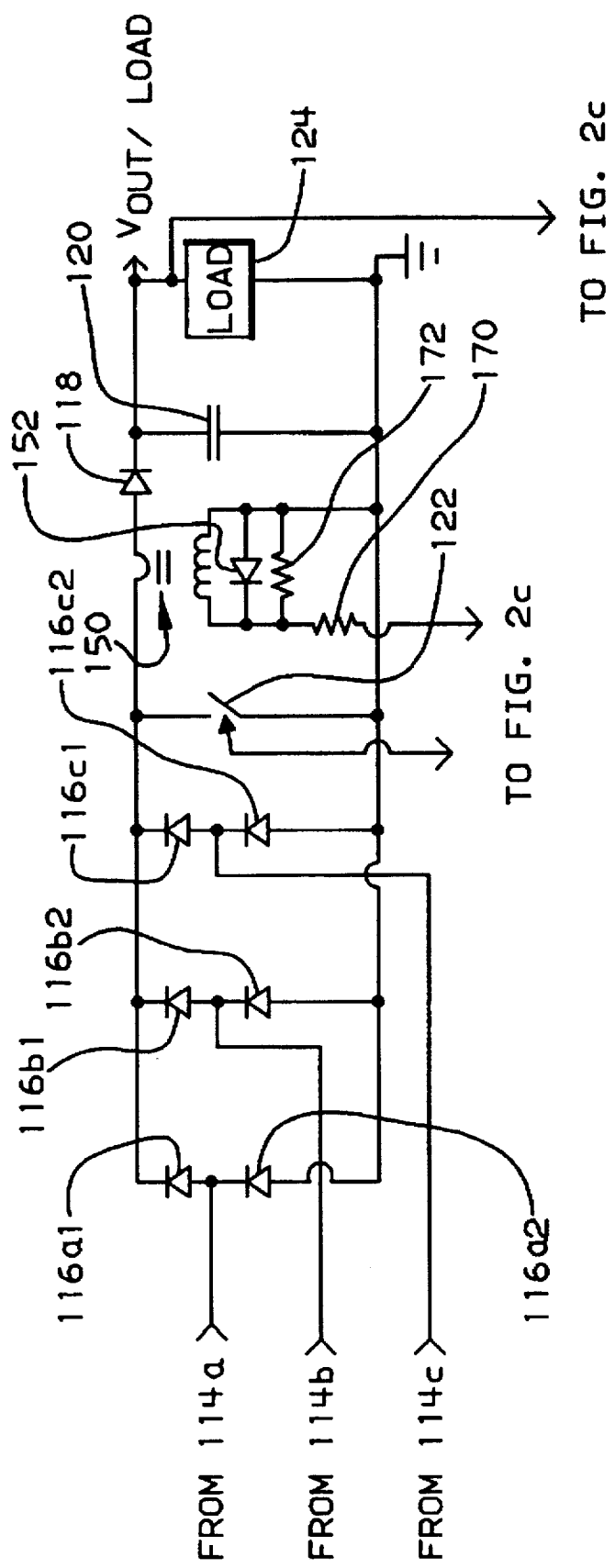
FIG. 2 illustrates a three phase input, boost power supply according to the present invention.
Figure 2C:
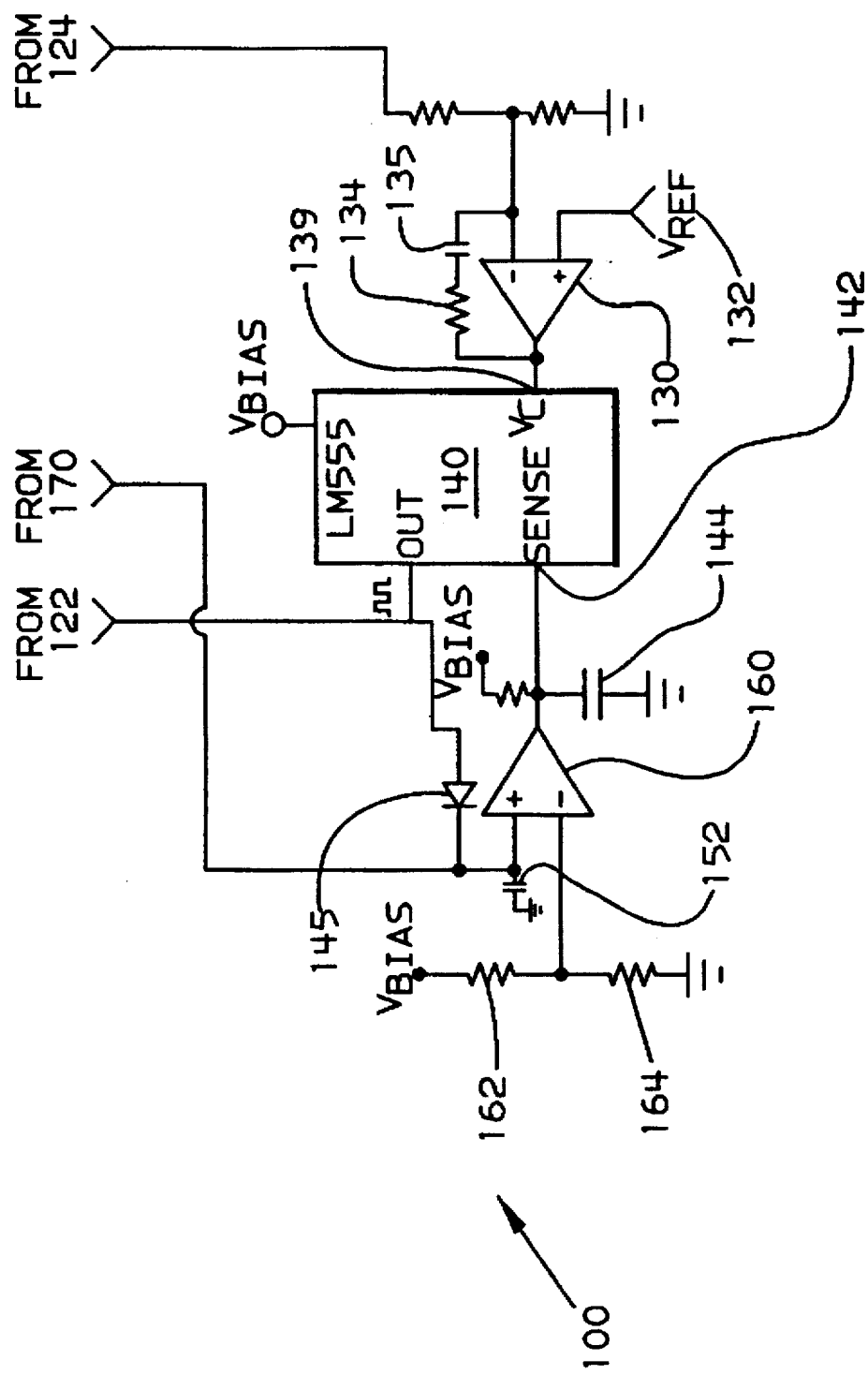

FIG. 2 illustrates a three phase input boost power supply generally designated 100 according to the present invention. Power supply 100 operates from three phases 102a, 102b and 102c. The input current from the three phases first passes through an input low pass filter 103 which filters out switching noise. The input low pass filter 103 comprises three series inductors 105a, 105b and 105c and three shunt capacitors 107, 109 and 111. By way of example, each of the inductors 105a,b,c is 50 microhenries, and each of capacitors 107, 109 111 is 0.1 microfarads. Next, the current passes through boost inductors 114a, 114b and 114c. Then, the current is full wave rectified by diode pairs 116a1,2, 116b1,2 and 116c1,2. An output diode 118 prevents discharge of an output capacitor 120 when a "chopping" switch 122 is closed, and passes current to a load 124 and capacitor 120 from the inductors 114a,b,c when switch 122 is open.

Switch 122 is controlled as follows to maintain the proper load voltage and maintain a sinusoidal input current with very high power factor. Switch 122 is turned off based on the following timing. A fraction of the output/load voltage (Vout) is supplied to the inverting input of an amplifier 130. The noninverting input is supplied with a DC reference voltage 132. The difference, an "error" voltage, is smoothed by an RC feedback circuit 134,135 and supplied to a control input 139 of a timer 140. Timer 140 is a Model LM555 from National Semiconductor Inc, (includes a comparator) and directly controls switch 122. A sense input 142 on timer 140 is supplied by a voltage across a capacitor 144 which is charged with DC current from a DC bias voltage via a resistor 145. When the capacitor 144 charges to a level above that of the control input 139, timer 140 turns off switch 122.

Switch 122 is subsequently turned on with timing based on the following. The current passing from inductors 114a, b,c through diode 118 is sensed by a current sense transformer 150 (for example, with a 1:50 primary to secondary turns ratio) and rectified by a diode 152. The rectified current produces a voltage across resistor 172 and this voltage is filtered by resistor 170 and capacitor 152. The resultant voltage of capacitor 152 is supplied to the noninverting input of an open collector comparator 160. The inverting input of comparator 160 is supplied by a fraction of a DC bias voltage via resistors 162 and 164. While current passes through transformer 150, filter capacitor 152 is charged to a level above this fraction of the bias voltage. However, when current ceases to flow through transformer 150, capacitor 152 quickly discharges through resistors 170 and 172. Soon, (for example 100 nanoseconds based on capacitor 152 equalling 100 picafarads, resistor 170 equalling 10 ohms and resistor 172 equalling 1 Kohms) the voltage across capacitor 152 is less than the fraction of the bias voltage applied to the inverting input, and comparator 160 discharges capacitor 144. This causes the input 142 to have a lower voltage than input 139, and consequently, timer/comparator 140 turns on switch 122, and charges capacitor 152 via a diode 145 for the next cycle. In this manner, the output/load voltage is maintained at a predetermined level. Also, the switch 122 was turned on at a time when there is substantially no current flow (less than ten milliamps) and also no charge stored in the junction of diode 118. Consequently, there was no current surge through switch 122 when switch 122 was closed.

Figure 3:
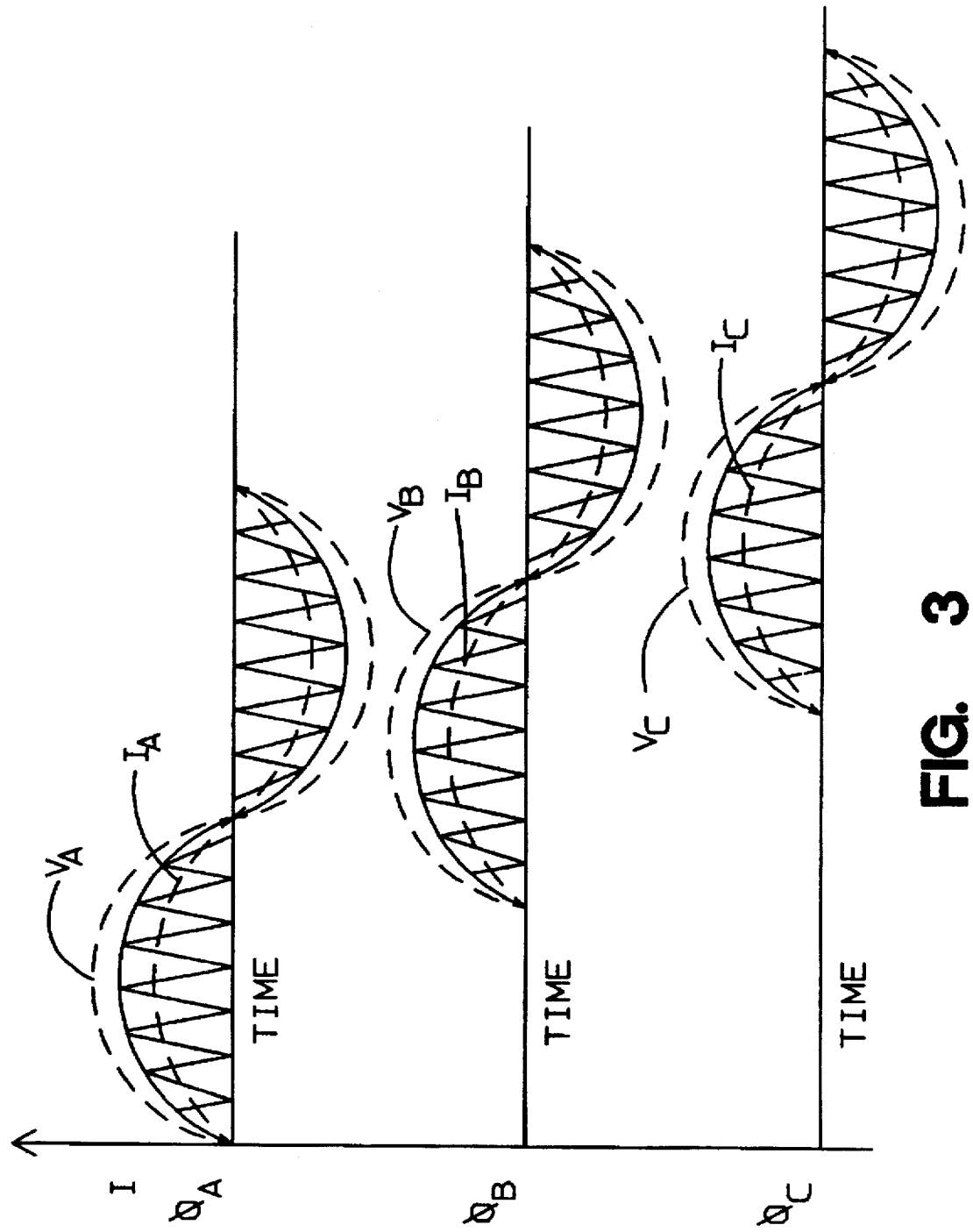
FIG. 3 illustrates input current (IA, IB and IC) and input voltage (VA, VB and VC) versus time graphs of the three phase input, boost power supply of FIG. 2.

Moreover, this manner of operating switch 122 causes the input current from each of the three phases 102a,b,c to be sinusoidal and substantially in phase with the respective input voltage phase, i.e. a very high power factor, even when one of the phases is lost. This is due to the following. As illustrated in FIG. 3, each rising portion of the (exaggerated) saw tooth input/boost inductor current represents the time during each switching cycle when switch 122 is closed. Each falling portion of the (exaggerated) saw tooth input/boost inductor current represents the time during each switching cycle when switch 122 is open. The on time is approximately constant (once the power supply is stable) due to the constant charging characteristic of capacitor 144 and the approximately constant control voltage at input 139. However, because the input voltage from each phase is sinusoidal, the average input/boost inductor current of each phase mimics the respective input voltage. The off time is variable and driven by the current through transformer 150. This causes the current to fall to zero before rising with the subsequent closure of switch 122. While FIG. 3 illustrates exaggerated saw tooth input current waveforms due to the on and off switching of switch 122, in actuality, the low pass filter 103 filters out this choppiness, leaving much smoother sinusoidal input current waveforms Ia, Ib and Ic that are nearly in phase with the respective input voltage waveforms Va, Vb and Vc. Thus, the average input current during each switching cycle from each phase 102a,b,c is nearly in phase with and proportional to the input voltage. Even when one of the phases drops out, the other two phases still operate as in FIG. 3 to provide a sinusoidal input current and nearly unity power factor.

Based on the foregoing, a three phase input power supply according to the present invention has been disclosed. However, numerous modifications and substitutions can be made without deviating from the scope of the present invention. Therefore, the invention has been disclosed by way of illustration and not limitation and reference should be made to the following claims to determine the scope of the present invention.

We claim:

1. A three phase input, boost power supply comprising:

first, second and third rectifiers having first, second and third respective cathodes connected together;

first, second and third boost inductors interposed between anodes of said first, second and third rectifiers, respectively and respective phases of said three phase input;

a diode having a cathode coupled to a load;

a current sensor connected between an anode of said diode and said first, second and third cathodes;

a chopping switch connected to said first, second and third cathodes such that when active said switch shunts current away from said load and when inactive said switch boosts a voltage of said load; and means for activating said switch in response to said current sensor sensing approximately zero current flow.

2. A power supply as set forth in claim 1 further comprising a low pass filter interposed between said three phase input and said first, second and third boost inductors.

3. A power supply as set forth in claim 2 wherein said low pass filter comprises fourth, fifth and sixth inductors interposed between said first, second and third boost inductors, respectively and the respective input phases, and first, second and third capacitors each connected between a different pair of the fourth, fifth and sixth inductors.

4. A power supply as set forth in claim 1 further comprising means for deactivating said switch based on a comparison of said load voltage to a reference voltage.

5. A power supply as set forth in claim 1 further comprising an output capacitor in parallel with said load.

6. A power supply as set forth in claim 1 further comprising means for deactivating said switch based on a comparison of a ramp voltage to a difference between said load voltage and a reference voltage.

7. A power supply as set forth in claim 1 further comprising fourth, fifth and sixth rectifiers connected with said first, second and third rectifiers, respectively to full wave rectify respective phases of said three phase input.

8. A power supply as set forth in claim 1 wherein:

said current sensor comprises a transformer having a primary winding connected between said anode of said diode and said first, second and third cathodes; and the activating means comprises a control for said switch and a second diode interposed between said control and a secondary winding of said transformer.

9. A power supply as set forth in claim 8 wherein said activating means further comprises a comparator having a first input coupled to said secondary winding and a cathode of said second diode, an anode of said second diode being coupled to said control.

10. A power supply as set forth in claim 1 further comprising means for controlling a duration that said switch is active based on a voltage of said load to maintain said voltage at a rated level.

11. A method for supplying a boosted DC voltage from a three phase input, said method comprising:

providing first, second and third full wave rectifiers for respective phases of said input, outputs of said first, second and third full wave rectifiers being connected together;

interposing first, second and third boost inductors between said first, second and third full wave rectifiers, respectively and respective phases of said three phase input;

connecting a switch to said outputs of said full wave rectifiers, when active said switch shunting current from said load and when inactive said switch boosting a voltage of said load;

connecting a cathode of a diode to the load, an anode of said diode being coupled to said full wave rectifier outputs;

sensing a current from said full wave rectifier outputs en route to said load via said diode; and activating said switch approximately when said current sensor senses approximately zero current flow.

12. A method as set forth in claim 11 further comprising the step of interposing a low pass filter between said three phase input and said first, second and third boost inductors.

13. A method as set forth in claim 11 further comprising the step of deactivating said switch based on a comparison of a ramp voltage to a difference between said load voltage and a reference voltage.

* * * * *